June 2, 1953 R. C. PARKES 2,640,250
CLOTH DRYING MACHINE
Filed Oct. 18, 1949 5 Sheets-Sheet 1
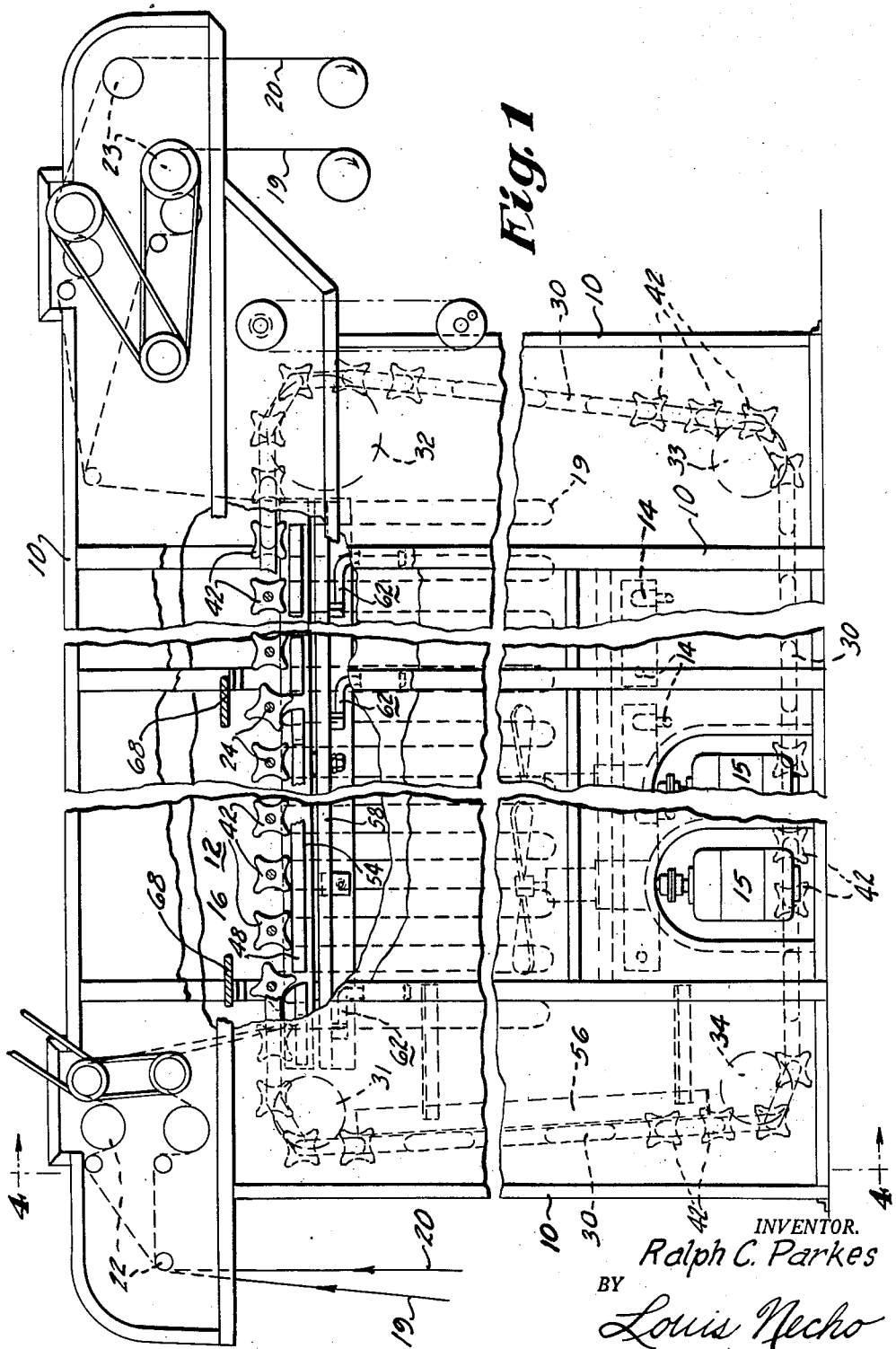
Fig. 1
INVENTOR.
Ralph C. Parkes
BY 
Attorney INVENTOR.
Ralph C. Parkes
BY Louis Necho
Attorney

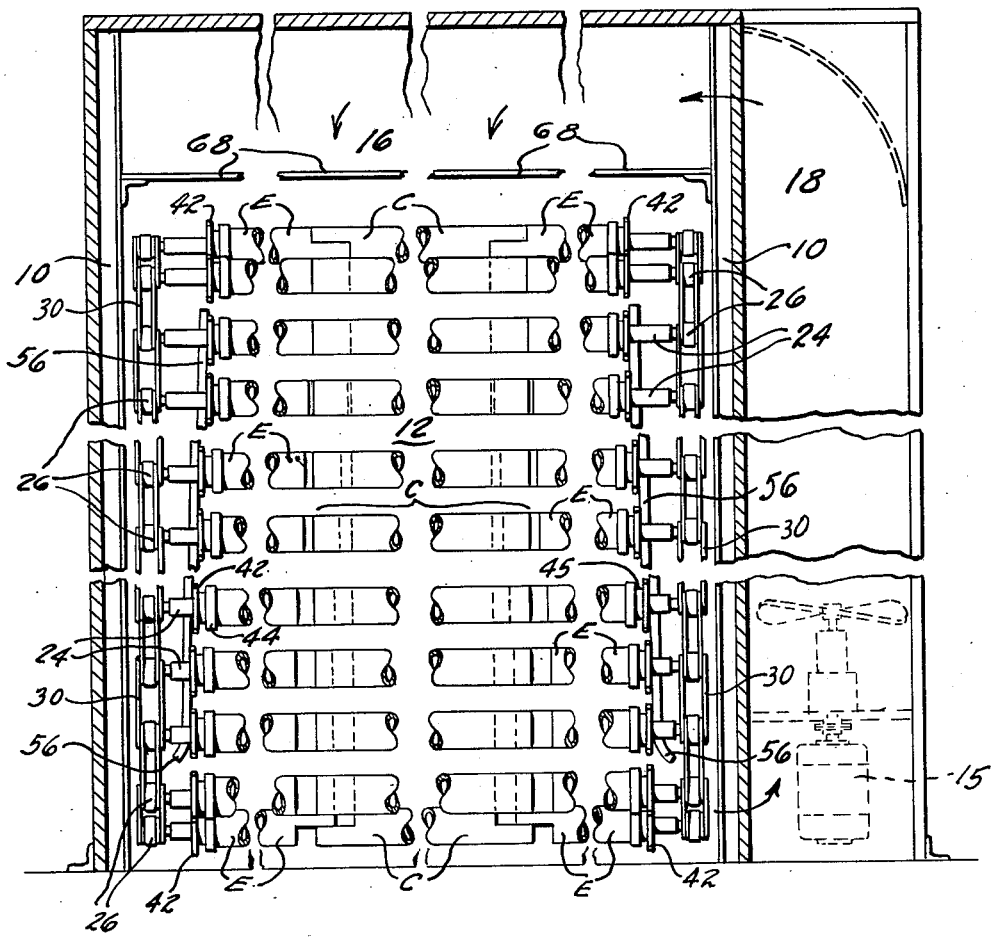

June 2, 1953  R. C. PARKES  2,640,250
CLOTH DRYING MACHINE
Filed Oct. 18, 1949  5 Sheets-Sheet 4
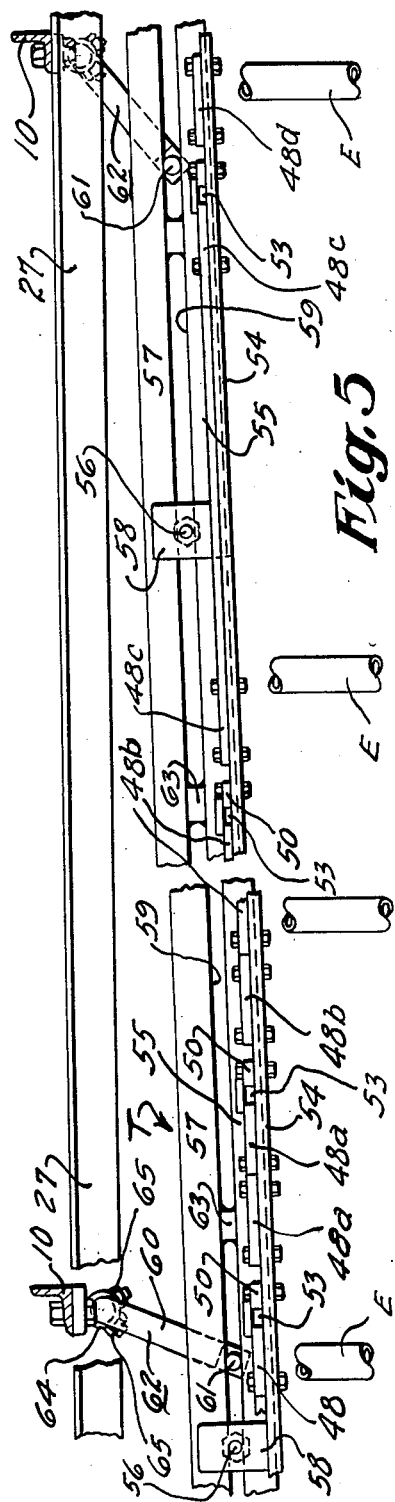
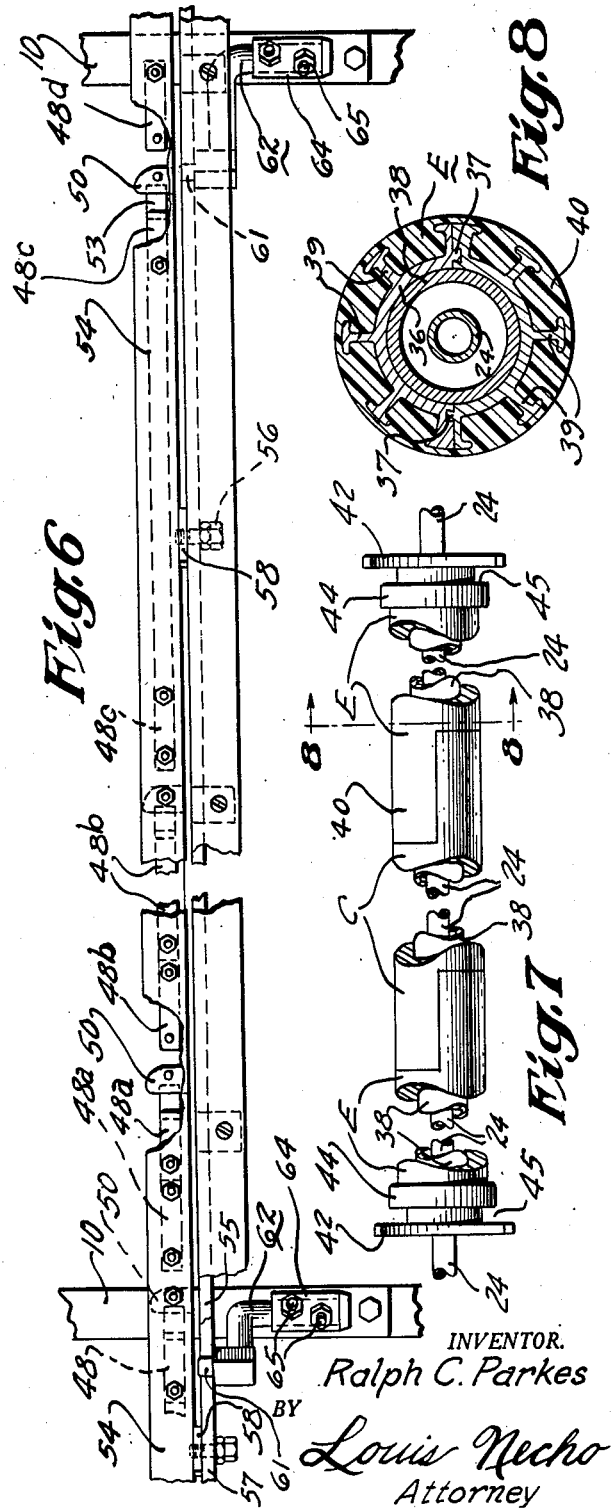
INVENTOR.
Ralph C. Parkes
BY Louis Necho
Attorney

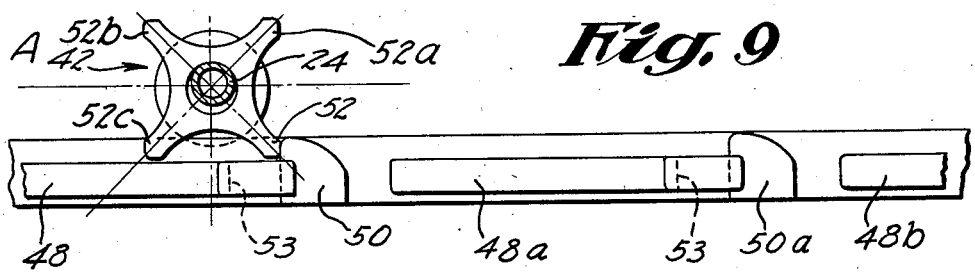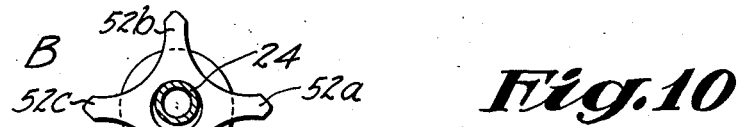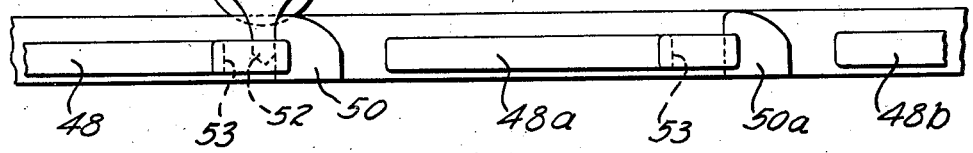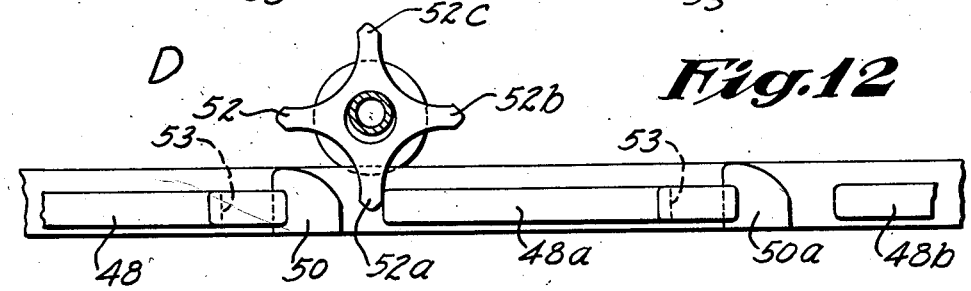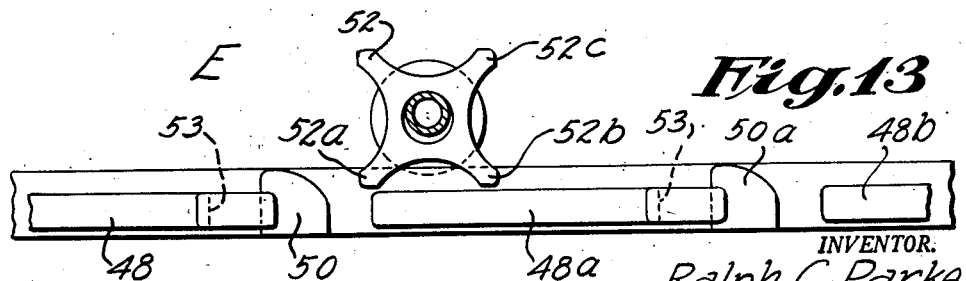

Patented June 2, 1953

2,640,250

UNITED STATES PATENT OFFICE 2,640,250

CLOTH DRYING MACHINE

Ralph C. Parkes, Glenside, Pa.

Application October 18, 1949, Serial No. 122,085

7 Claims. (Cl. 26—68)

1

In the art of drying cloth, or other sheet material, the material to be dried is festooned, in the form of substantialy uniform loops, on rotatable rolls or poles which are propelled through a drying chamber and relatively high velocity heated air is blown downwardly on the loops while they move through said drying chamber.

Due to the high velocity of the heated air, it happens that a loop of the material is billowed or blown against an adjacent loop and the frictional engagement of the contacting portions of adjacent loops exerts a drag on one side or another of the loops involved. If, under these circumstances, the poles carrying the loops are free to turn about their axes, the drag exerted on a wall of a loop will cause the pole supporting such loop to turn in one direction or another. The turning of the affected pole will lengthen or shorten the corresponding wall of the loop and will unbalance the loop. This imbalance of the loop induces further turning of the supporting pole and will thus accentuate the imbalance with the result that a loop may be pulled off its pole completely and another loop may get wrapped around the pole from which it hangs. Obviously, such disruption of one loop may disrupt other adjacent loops with considerable attendant trouble and expense.

It is, therefore, one object of the invention to produce an improved construction in which the poles carrying the loops cannot turn about their axes as they move through the drying chamber except at predetermined locations where they are turned by positive means provided for that purpose. By this arrangement, the frictional engagement of the loop with the supporting poles will equal or exceed the drag exerted on a pendant wall of a loop which is billowed or blown into contact with an adjacent loop and will prevent, or reduce, disruption of such loop.

However, in order to insure against a loop being blown or billowed by the drying air while the sustaining pole is being turned at one of the predetermined locations above mentioned, I interpose baffles or buffers between the source of drying air and the points at which the poles are turned, whereby the loop on the pole being turned is subjected only to a relatively gentle current of drying air, and is protected against impact by high velocity air during rotation of its supporting pole. Further, in order to keep the material smooth, and to subject it to a certain amount of stretching in a direction transverse to the direction of movement of the material through the drying chamber, expansible poles are

2 used and means are provided for expanding the poles. A practical and satisfactory construction of this type is shown in prior Patent No. 1,997,696, issued to B. A. Parkes, on April 16, 1935, and entitled "Cloth Drying and Spreading Machine," and in my prior Patent No. 2,398,190, issued April 6, 1946, and entitled "Expansible Pole Construction for Drying Machines."

It is, therefore, a further object of my invention to produce improved means for expanding the expansible poles and improved means for varying the rate at which, or the extent to which, poles are expanded every time they pass once through the drying chamber.

A still further object of the invention is to produce an improved construction whereby the means for expanding the poles and the means for varying the rate at which, or the extent to which, the poles are expanded may be serviced or adjusted, without in any way interfering with the other parts of the machine, so as to vary the expansion of the poles during their progress through the drying chamber, according to varying requirements.

These and other objects are attained by my invention, as set forth in the following specification and as illustrated in the accompanying drawings in which Fig. 1 is a diagrammatic, side elevational view of a drying machine embodying my invention.

Fig. 4 is a view, partly in section and partly in elevation, looking in the direction of line 4—4 on Fig. 1.

Fig. 5 is an enlarged, fragmentary top plan view showing details of construction.

Fig. 6 is a side elevational view of Fig. 5.

Fig. 7 is enlarged view showing the expansible pole structure.

Fig. 8 is an enlarged, sectional view taken on line 8—8 on Fig. 7.

Figs. 9 through 13 are fragmentary, diagrammatic views showing details of construction and the manner of operation.

Figure 2:
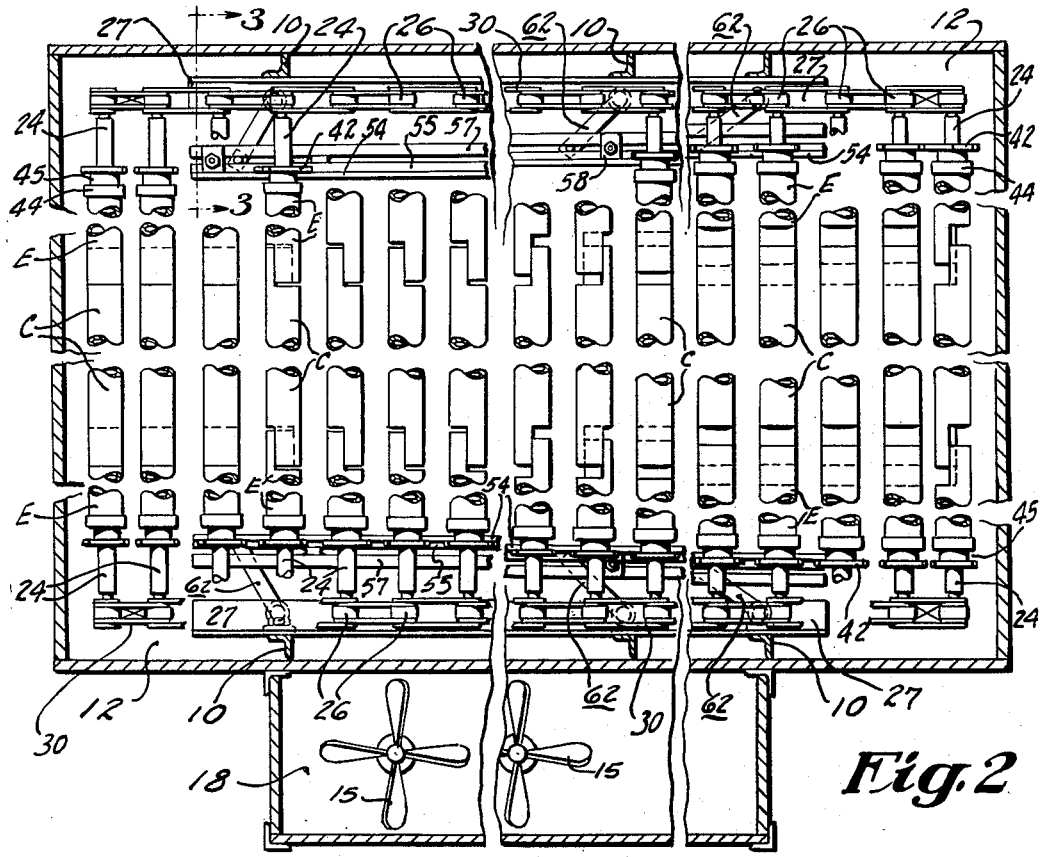
Fig. 2 is a diagrammatic, top plan view of the same.

The drying machine shown includes a frame 10 which is covered with insulated walls to produce a drying chamber 12. The insulated walls may be constructed of the panels disclosed in my Patent No. 2,447,272 of August 17, 1948, entitled "Insulated Panel." The drying chamber may be suitably heated to the desired extent. For example, air may be heated by heaters 14, located near the bottom of the drying chamber, and propelled by blowers 15 into the upper portion 16 of the drying chamber. The blowers 15 are located in a compartment 18 which communicates with the top and bottom of the drying chamber and the air may be diffused in the manner set forth in my prior Patent No. 2,449,667 of September 21, 1948.

Figure 3:
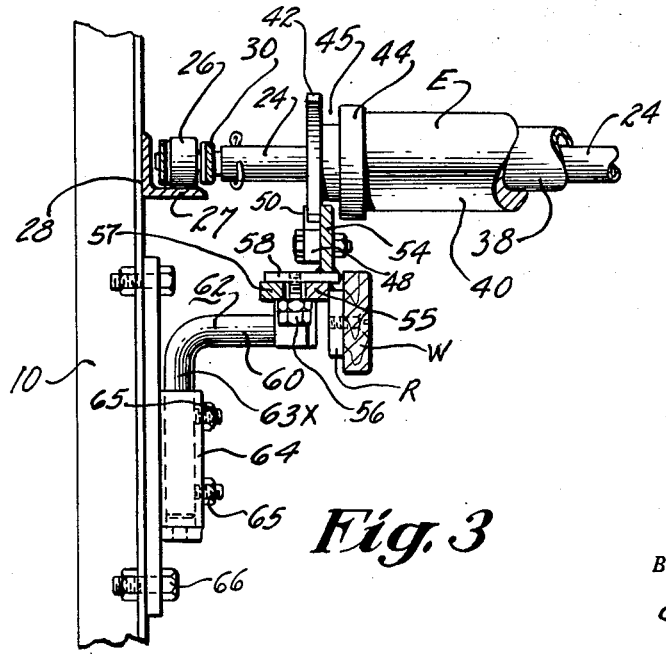
Fig. 3 is an enlarged, fragmentary sectional view taken on line 3—3 on Fig. 2.

The cloth, be it one piece, or, as shown, two pieces 19 and 20, is fed into the drying chamber by a set of feed rolls 22 and is removed from the drying chamber by a set of delivery rolls 23 both of which may be conventional it being only necessary to point out that, when two, or more, pieces of cloth are dried simultaneously, they are laid side by side on the poles as shown in Fig. 3 of Patent No. 2,449,667 above mentioned.

The cloth delivered by the feed rolls is draped in the form of uniform loops over a number of identical hollow poles which move endlessly through the drying chamber. Each pole includes at least two sections with means for effecting relative movement of one, or both, of said sections so as to lengthen or expand the pole and thus smooth out the fabric draped on the pole. In the embodiment illustrated each pole is formed of a center section C and two end sections E, the center section being rotatable about, but not movable in the direction of, its axis and the end sections being rotatable about, and movable longitudinally of, said axis. A rod 24 passes through each pole and carries end rollers 26 adapted to ride on tracks 27 which, as best shown in Figs. 2, 3, and 5, are the horizontal walls of angle irons which are secured to opposite sides of the frame 10 as at 28. Inwardly of the tracks 27, the rod 24 is secured to sprocket chains 30 which travel endlessly over opposite pairs of driving or idle sprocket wheels 31, 32, 33 and 34 to propel the rods 24 and the poles endlessly through the drying chamber.

The poles may be constructed as shown in Patent 1,997,696 above mentioned, or as shown in my Patent 2,398,190 of April 9, 1946, entitled "Expansible Pole Construction For Drying Machines," and may or may not include an inner, reinforcing pipe 38. However, in the present instance, the poles are formed by extruding elongated, semi-cylindrical sections 36 which are slidably secured together by a dove-tail arrangement as best shown at 37 in Figs. 7 and 8. Also, in the embodiment illustrated, the semi-cylindrical sections 36 are provided with longitudinally extending, T-shaped, ridges 39 and are covered, as at 40, with one of a number of heat-resisting synthetic materials which are now available on the market. The extruded poles described are formed of any suitable light and rigid metal such as an alloy of aluminum and magnesium, or the like. It is to be noted that the outer ends of the ridges 39 are well covered with the synthetic material, and that this material is a poor heat conductor so as to prevent direct contact of the metal with the cloth and thus safeguard against scorching or marking of the cloth.

As stated, the center section C is suitably keyed to rod 24 so as to be rotatably about, but not slidable longitudinally of the rod 24. The end sections E, on the contrary, are both rotatable about and are slidable longitudinally of this rod.

In order to prevent continuous rotation of the poles, the gears and racks used in Patent 1,997,696 above mentioned are omitted and the end sections E of the poles are provided with polygonal heads 42 and inwardly spaced hubs 44 which coact to form grooves 45 for a purpose hereinafter set forth. As shown, the heads 42 are substantially square but they could be of a rectangular, triangular or other shape which will lend itself to the manner of operation hereinafter set forth. Except during the intermittent turning of the pole, the heads 42 of each pole are out of engagement with any track or other support but, in order to prevent a pole from turning about its own axis when it is not intended to do so, track sections 48, 48a, 48b, 48c, etc., are located immediately below the path of movement of the heads 42 and are closely spaced from the bottoms of the heads so as to limit, to a small angle, any unintended rotation of the heads 42 and, hence, of the poles themselves, as long as said heads are moving above the track sections.

In order intermittently to rotate each pole, the track sections 48, 48a, 48b, 48c, etc. are spaced and trippers 50 are provided at suitable intervals. The trippers coact with the edges of successive track sections to engage the leading point, corner or edge 52 of a head 42 and, by obstructing its movement, to rotate the head 42, and the corresponding pole, about the axis of rod 24.

Thus as shown at A in Fig. 9, the heads 42 on the ends of a pole move horizontally (from left to right) just above, and out of contact with the track section 48 until the then leading corners or edges 52 of the heads abut the trippers 50 whereby, as the poles continue to move from left to right, the heads, and the poles carried thereby, will have moved through an angle of about 45 degrees, as shown at B. By the time the poles have moved to station C, the heads 42 will have turned through an additional angle of approximately 45 degrees and the now leading edge or corner 52a will abut the edge of the next track section 48a whereby, as the poles continue to move from left to right the heads will have turned through an additional angle of about 45 degrees as shown at D. Further movement of the poles from left to right causes the heads 42 to move through an additional 45 degrees, or to the position shown at E. The heads 42 now begin moving above track sections 48a, as they did above track section 48 in position A of Fig. 9. This means that the heads will have moved through a total rotation of 180 degrees. The heads 42 now travel just above track section 48a until the next tripper 50a and the next track section 48b are encountered whereupon the poles are again turned through a total angle of 180 degrees in the manner just described. Thus every time the heads 42 move completely past a pair of trippers and the adjacent edges of the succeeding pair of track sections, they will be turned through an angle of 180 degrees. It will be noted that spaces 53 are provided between ends of adjacent track sections and on either side of the trippers to accommodate the corners of the heads while the latter are being turned by one of the trippers 50 or by the edge of a track section. If desired, the intervals or the spaces between trippers 50, or the lengths of successive track sections, increase from the feed, or the left hand, to the delivery, or the right hand end, of the machine as shown in Fig. 5. Because the track sections are closely spaced from the bottoms of the head 42 poles can only tilt until they contact the track therebeneath, and the poles carried can be rotated only when their heads 42 are engaged by the trippers and the edges of succeeding track sections.

In order to stretch or expand the poles, I provide diverging rails 54 which are best shown in Figs. 2 and 5, and which are so located as to enter the grooves 45 between the heads 42 and the hubs 44 as best shown in Fig. 3. The rails 54 diverge from the feed, or left hand end of the machine towards the delivery or the right hand end of the machine so that, as the poles move through the drying chamber, the end pieces E of each pole are pulled away from the center piece C. This is best shown in Fig. 2 in which the opposite inner ends of the sections E abut the outer ends of the center sections C at the feed end of the machine and in which the ends referred are progressively increasingly spaced apart towards the right hand or delivery end of the machine.

The poles are foreshortened or contracted by means of downwardly diverging rails 56, which are shown in Fig. 4 and which are located at the left hand vertical end of the machine as viewed in Fig. 1. By this arrangement, after the poles have travelled across the bottom of the machine, and as they climb toward the point at which the cloth is fed onto the poles, the outer faces of the heads 42 of the poles will engage the upwardly converging rails 56 and the end pieces E of the poles will be pushed inwardly until their inner ends abut the outer ends of the center section C. The rails 54 are detachably secured to tracks T which extend longitudinally of the drying chamber and which diverge from the feed end to the delivery end of the machine. Since the rails 54 and the diverging tracks T are identical only one of them will be described. Thus, and as will be seen from Figs. 3 and 5, each of the diverging tracks is formed of two strips 55 and 57 which are held together in spaced relationship by blocks 63 to form a slot 59. Each diverging rail 54 is detachably secured to a track T by means of plates 58 which are secured, at intervals, to the lower edge of rail 54 and which are detachably clamped to the track T by means of inverted bolts 56, the shanks of which pass through the slot 59 to engage the plates 58.

The diverging tracks are supported by the ends of horizontal arms 60 of angle members 62 the vertical arms 63x of which are freely rotatable in sockets 64 suitably secured to the frame 10 as at 66. The angle members can be retained in the desired angular position by tightening set screws 65 against vertical arms 63x. The ends of horizontal arms 60 are provided with vertical pins 61 which engage the slots 59 above mentioned.

In order to protect the cloth against contact with the metallic parts, an auxiliary rail R is welded or otherwise secured to strip 55 and is covered with a piece of wood W or other heat-insulating material.

In order to prevent the long diverging tracks T from sagging, downwardly or laterally, and in order to insure satisfactory adjustment of the divergence of the tracks, a plurality of the combined supporting and adjusting devices are used, at suitable intervals, as shown from Figs. 2 and 3.

When it is desired to change the divergence of the rails 54, the set screws 65 of all the supporting and adjusting devices are loosened and after the rails 54 have been moved to the desired position, the adjusting devices at the feed and delivery ends of the machine are moved to the proper position and their set screws are adjusted. This fixes the position of the rail and the intermediate supporting and adjusting devices are then set in position and their set screws 65 are tightened.

While the poles are moving forwardly without rotating, the impact of the drying air on the cloth will not ordinarily cause any disturbance of the loops. But, when a pole is rotating, the impact of the air on the loop of cloth tends to distort or displace such loop. To prevent this, I have provided baffles or shields 68 placed immediately above the pole trippers 50 and in the path of the blast of air which moves downwardly towards the poles. By this construction, the loop is protected against violent impact of the drying air during the rotation of the pole which supports it.

The rail 54, may, if desired, be made in sections and, if desired, the pole collapsing diverging rails 56 can be omitted and the rails 54 can be continued downwardly at the delivery end of the drying chamber, horizontally, below the drying chamber and upwardly at the feed end of the drying chamber. If this is done, the rails 54 can begin to converge, so as to collapse the poles, at any point after the cloth has left the poles.

What I claim is:

1. For use in a drying machine of the type which includes a drying chamber, a plurality of poles for supporting the material to be dried, and means for moving said poles through the drying chamber, means for rotating said poles at selected points as they move through the drying chamber, and means for preventing rotation of the poles between said points, the spaces between said selected points increasing progressively from the intake toward the delivery end of the drying chamber.

2. For use in a drying machine of the type which includes a drying chamber, a plurality of poles for supporting the material to be dried, means for moving said poles through the drying chamber, and means for directing a current of fluid drying medium downwardly onto the poles and the material carried thereby, means for rotating said poles at selected points as they move through the drying chamber, and means for preventing direct impact of the fluid drying medium on the poles and the material during rotation of the poles.

3. For use in a drying machine of the type which includes a drying chamber, a plurality of expansible poles for supporting the material to be dried, each of said poles being formed of at least two sections rotatable about a common axis, with only one of said sections slidable, longitudinally of said axis toward or away from the other of said sections, and means for moving said poles through the drying chamber, a rail disposed adjacent and extending longitudinally of the path of movement of the poles through the drying chamber, said rail forming an acute angle with the median line of said path of movement with the apex of the angle at the end of the drying chamber at which the material to be dried is fed onto the poles, means carried by said poles for engaging said rail whereby said movable sections are progressively moved away from said other sections, and means for varying the angle between said rail and said path of movement.

4. For use in a drying machine of the type which includes a drying chamber, expansible poles for supporting the material to be dried, each of said poles being formed of at least two sections having relative, longitudinal movement to each other in the direction of the axis of the pole, elongated, horizontal diverging tracks, means at the ends of said sections for engaging said diverging tracks whereby, as the pole moves through the chamber the sections thereof are progressively moved apart, and means for varying the divergence of said tracks, including supports for the tracks, means mounting said supports for rotation about vertical axes, whereby the rotation of said supports about their axes moves the tracks toward, or away from each other according to the direction of rotation, and means for locking said supports in position.

5. For use in a drying machine, a plurality of poles adapted to carry the material to be dried, polygonal heads at the ends of each of said poles, a plurality of spaced track sections, means supporting and propelling said poles through the drying chamber with the said head above said track sections, and trippers located in the spaces between said track sections and adapted to engage said polygonal heads and turn them through an angle of less than 90 degrees, said polygonal heads being so constructed and arranged that they are engaged by the ends of successive track sections and turned through a further angle of less than 90 degrees.

6. For use in a drying chamber, a plurality of poles for carrying the material to be dried, a plurality of projections at the ends of each said poles, means for supporting and propelling said poles through said drying chambers, a first set of spaced trippers below the path of movement of the ends of said poles for engaging alternate projections and effecting partial rotation of said poles about their respective axes, and a second set of spaced trippers also located below the path of movement of the ends of the poles for engaging other alternate projections and effecting further, partial rotation of said poles.

7. The structure recited in claim 6 in which said first set of trippers is in a plane above the plane of said second set of trippers.

RALPH C. PARKES.

References Cited in the file of this patent

UNITED STATES PATENTS

| Number | Name | Date |
| --- | --- | --- |
| 1,494,307 | Hinnekens | May 13, 1924 |
| 1,557,368 | Kershaw | Oct. 13, 1925 |
| 1,997,696 | Parkes | Apr. 16, 1935 |
| 2,436,719 | Hurxthal | Feb. 24, 1948 |